(12) United States Patent
Beggs (10) Patent No.: US 7,914,678 B2
(45) Date of Patent: Mar. 29, 2011

(54) BACKWASHING UNSATURATED WASTEWATER FILTER

(76) Inventor: Robert A. Beggs, Woodland, CA (US)

( * ) Notice: Subject to any disclaimer, the term of this patent is extended or adjusted under 35 U.S.C. 154(b) by 75 days.

(21) Appl. No.: 12/394,619

(22) Filed: Feb. 27, 2009

(65) Prior Publication Data

US 2009/0294356 A1    Dec. 3, 2009

Related U.S. Application Data

(60) Provisional application No. 61/057,475, filed on May 30, 2008, provisional application No. 61/057,645, filed on May 30, 2008.

(51) Int. Cl.
*C02F 3/04* (2006.01)

(52) U.S. Cl. ......... 210/617; 210/618; 210/150; 210/903

(58) Field of Classification Search .................. 210/617, 210/618, 793, 794, 795, 150, 151, 274, 275, 210/903
See application file for complete search history.

(56) References Cited

U.S. PATENT DOCUMENTS

| | | | | |
|---|---|---|---|---|
| 853,217 | A | * | 5/1907 | Bordigoni ...................... 210/150 |
| 947,333 | A | * | 1/1910 | Hamilton ...................... 210/618 |
| 2,220,859 | A | * | 11/1940 | Bispham et al. ............. 210/617 |
| 3,545,619 | A | * | 12/1970 | Ettlich et al. ................. 210/275 |
| 3,725,263 | A |  | 4/1973 | Harris |
| 3,846,305 | A | * | 11/1974 | Schreiber ...................... 210/150 |
| 4,076,616 | A |  | 2/1978 | Verde |
| 4,179,374 | A | * | 12/1979 | Savage et al. ................. 210/151 |
| 5,348,654 | A | * | 9/1994 | Fischer ......................... 210/151 |
| 5,525,230 | A | * | 6/1996 | Wrigley et al. ............... 210/618 |
| 5,578,200 | A |  | 11/1996 | Funakoshi et al. |
| 5,633,163 | A |  | 5/1997 | Cameron |
| 6,383,373 | B1 |  | 5/2002 | Nakao et al. |
| 6,790,347 | B2 |  | 9/2004 | Jeong et al. |
| 2006/0124540 | A1 | * | 6/2006 | Austin et al. ................... 210/617 |

FOREIGN PATENT DOCUMENTS

JP    7-155751    *   6/1995

* cited by examiner

*Primary Examiner* — Christopher Upton
(74) *Attorney, Agent, or Firm* — Temmerman Law Office; Mathew J. Temmerman (57) ABSTRACT

A compact high efficiency combined biological and physical unsaturated wastewater treatment filter configured for periodic backwashing is disclosed. The filter utilizes packed media and removes pollutants and pathogens from wastewater and other dirty water sources. The filter comprises a periodic backwashing means to less the chance that biofilm growth will clog the media pores. However, such backwashing still leaves sufficient biofilm attached to the media to maintain a very high level of treatment. In the preferred embodiment, the filter utilizes high frequency dosing to cause pore saturation at or near the surface during dosing and shortly thereafter in order to maximize distribution uniformity and to induce downward airflow into the media. The system provides a number of unexpected benefits; including allowing a very low distribution pressure and providing high oxygen transfer at low energy utilization into the filter media for aerobic biodegradation of pollutants.

14 Claims, 9 Drawing Sheets

BACKWASHING UNSATURATED WASTEWATER FILTER

RELATED APPLICATIONS

This application is related to previously filed U.S. provisional patent applications having Ser. Nos. 61/057,475 and 61/057,645, both filed May 30, 2008, and both entitled "Pulse-Fed Backwashing Unsaturated Filter". Both are incorporated by reference herein as if set out in full.

BACKGROUND

1. Field of the Invention

The present invention is related to wastewater treatment filters, and in particular to a compact, high efficiency, combined biological and physical treatment filter for removing pollutants and pathogens from wastewater and other dirty water sources.

2. Background of the Invention

Decentralized wastewater treatment systems typically comprise a septic tank into which raw wastewater is introduced from one or more residences or businesses. In the septic tank or other settling means, solids are typically removed by gravity settling, and other constituents are partially removed by passive anaerobic biological treatment. When a higher level of treatment is required, the septic tank wastewater is generally directed to a biological filter or other treatment system. After treatment, the treated effluent is typically discharged into a lateral field comprising a plurality of underground parallel drainpipes or irrigation tubes that discharge the treated effluent into the underground environment through a plurality of openings on each lateral drainpipe or tube.

One type of biological filter is the biological wastewater trickling filter. Conventional trickling filters apply wastewater to the top of the trickling filter from an overhead rotary distributor. The filter is generally a fixed coarse medium comprising rocks or pieces of shaped plastic. Biological life on the surfaces of the filter media provides the primary means for wastewater treatment in such filters. The media is unsaturated to provide maximum opportunity for oxygen transfer to aerobic microbes on the media. Filters of this design are cost efficient and have wide commercial acceptance. There are several factors, however, that prevent conventional trickling filters from meeting some of the stricter established parameters for effluent discharge into the environment. Because they use a fixed media bed, these system do not rely on the superior method of backwashing to remove excess biological growth and solids from the trickling filter effluent, but instead rely on gravity sloughing, followed by settling in an external secondary clarifier. The external clarifier adds significant cost and complexity to the system that otherwise would not be present. Intermittent sand filters and recirculating sand filters are types of trickling filters that use sand instead of rocks or larger media in order to achieve a higher degree of both biological and physical treatment than conventional trickling filters. Intermittent and recirculating sand filters also rely on substantial degradation of excess solids within the media pores rather than removal in an external clarifier. Because they employ a fixed bed, intermittent and recirculating sand filters are loaded at very low rates to prevent plugging, and are also not backwashed. Finally, they do not produce final treated effluent with the quality equaling that of treated effluent from fine media filters.

A second type of biological filter is the biological aerated filter, which is used to remove nitrogen compounds and carbonaceous material from wastewater. These filters utilize submerged media to provide sites for attached fixed-film microbial growth. Biological aerated filters may be of upflow or downflow design, and are periodically backwashed. Biological aerated filters are operated in a saturated state and utilize pressurized bubble aeration to supply oxygen for aerobic microbes. Therefore, such filters require a substantial amount of energy to operate.

A third type of filter is the rapid sand filter, which is in common use in the source water treatment industry for physical filtration and in the wastewater industry as a final wastewater polishing treatment. Unlike trickling filters, rapid sand filters are backwashed through a process that fluidizes the media bed. However, rapid sand filters are run at high hydraulic loading rates and are fully saturated by maintaining a water head or pressure over the filter surface. Rapid sand filters are principally designed and operated to provide physical filtration. Biological treatment is not an objective because biological growth substantially reduces the hydraulic capacity of rapid sand filters to perform their primary function of physical filtration. Furthermore, the continuously saturated conditions in rapid sand filters are not conducive to efficient aerobic biological treatment of wastewater.

Thus, conventional solutions for aerobic biological wastewater treatment using unsaturated filter media involve fixed (that is, non-fluidizing and normally non-backwashed) media. Biological aerated filters utilize media that is periodically backwashed, but are operated in a saturated state and use bubble aeration to supply oxygen to aerobic microbes on the media. For those physical water treatment solutions that do involve backwashing, the media is saturated by pressurized water that is essentially continuously maintained above the media surface, and biological growth is viewed as a detriment to physical filtration performance rather than as a desired object of design.

DESCRIPTION OF RELATED ART

One of the closest known prior art systems is the Amphidrome® by F. R. Mahoney. According to company statements, it "is a submerged attached growth bioreactor process, designed around a deep-bed sand filter." It is specifically designed for the simultaneous removal of soluble organic matter, nitrogen and suspended solids within a single reactor. The Amphidrome is a sand media filter that works with a septic tank and an effluent storage tank and has a periodic backwash cycle. Similar to a conventional biological aerated filter, the Amphidrome is continuously saturated and uses a pressurized air diffuser at the bottom of the bioreactor to provide oxygen to the biofilm (see U.S. Pat. Nos. 5,989, 427, 5,776,344 and others). Further, the Amphidrome system is not vertically compact and requires a relatively large amount of energy usage. There is thus a need to provide a more vertically compact filter requiring a low amount of energy.

Textile biofilters are one of the most recent innovations in small wastewater systems. Textile biofilters utilize an open-structure textile mat instead of sand or gravel as a fixed biological filter media. They are pulse-fed (that is, periodically dosed with wastewater), unsaturated, and allow some of the highest wastewater loading rates of currently available fine media unsaturated wastewater treatment filters. However, textile biofilters cannot be effectively backwashed and their recommended surface area loading rates, expressed in gallons per day per square feet (gpd/sf) of filter surface area, must be maintained at moderate levels in order to prevent long-term plugging. For example, textile biofilters are typically designed for a net loading rate of 20 gpd/sf. This is an improvement over the typical net loading rate of 5 gpd/sf for fixed bed recirculating gravel filters, but is still far below the net loading rate of 100 gpd/sf exhibited by the present invention. Therefore surface area loading rate is one area in which textile biofilters and other fixed bed fine wastewater filters are still lacking. Even biofilters with large amounts of porosity tend to build up biofilm and solids, eventually causing some hydraulic short-circuiting of the media. Finally, textile filters sometimes require hose washing to clear buildup. See products and patents by Orenco Systems, Inc. for more details (U.S. Pat. Nos. 6,372,137; 5,980,748; 5,531,894; 5,480,561; 5,360,556; 5,492,635; 4,439,323; D461,870; and D445,476). There is thus a need for a biofilter that provides a high degree of treatment similar to conventional unsaturated sand and textile biofilters, but that does so without the drawbacks associated with the relatively low surface area loading rates commonly found in such systems.

U.S. Pat. No. 7,309,434 to Potts discloses a pulse-fed unsaturated media filter for wastewater treatment that provides intermittent forced air above the media prior to each wastewater dose. The airflow that is induced into the media provides oxygen for nitrification of ammonia to nitrate. Interruptions in the supply of air allow anoxic conditions to develop, providing denitrifying conditions. This is useful for specific cases where enhanced nitrogen removal is required, but it does not provide any improvement in surface area loading rate capacity over conventional sand and textile biofilters, resulting in a physically large filter for a given amount of treatment capacity. Potts refers to a dosing rate "most preferably" in the range of 3 to 10 gpd/sf, beyond which the bed is subject to progressive clogging or being "overwhelmed." There is thus a need to provide a more compact unsaturated filter capable of being backwashed, and that provides higher surface area loading rates with more efficient and natural air circulation. Neither Potts' nor other known unsaturated wastewater treatment filters contain the proper geometry, tanks, pump(s), valve(s), controls, and other associated components to enable them to be effectively backwashed through fluidization.

There is thus no known wastewater treatment device that provides a combination of generally unsaturated conditions suitable for aerobic biological fixed film treatment and periodic backwashing through fluidizing the filter media.

Because the conventional unsaturated systems that utilize fine media are limited to much lower hydraulic loading rates, existing fixed sand or textile media filters must rely on a pressurized spray or squirt application system for distributing wastewater over the filters' large surface areas. In addition, because of the spray or squirt type of application, these filters do not typically create a uniform downward flow of air into the upper part of the media to enhance oxygen availability for aerobic treatment.

The present invention overcomes these and other problems that are inherent with existing biological fixed-film filter wastewater treatment systems by providing a system which is capable of high surface loading rates on fine media at very low pressure, where long-term plugging of the media is prevented by periodic backwashing, and aerobic conditions can be maintained with minimal energy throughout most of the filter to provide the maximum rate of aerobic biological treatment.

It is therefore a first object of the present invention to provide a means for maintaining optimal moisture and oxygen conditions for biological wastewater treatment in a predominantly unsaturated filter with relatively fine media.

It is a further object of the invention to provide a compact and energy efficient wastewater treatment filter.

It is a further object of the invention to provide a compact unsaturated backwashing filter with a high surface loading rate and that provides efficient and natural air circulation.

It is a further object of the invention to provide effective wastewater treatment in a compact filter that enables treatment similar to that achieved in conventional unsaturated sand media biological wastewater filters approximately twenty times larger.

It is a further object of the invention to provide an air vent located below the surface of an unsaturated backwashing filter to allow ready air movement down through and out of the filter.

It is a further object of the invention to provide a biological wastewater filter that maintains an optimum level of biofilm growth while simultaneously remaining free from clogging that is normally associated with extended periods of biological growth.

It is a further object of the invention to provide a filter which, through the use of sufficiently fine media, provides effective physical filtration concurrent with biological treatment.

It is a further object of the invention to provide a highly energy efficient means for transferring oxygen to the aerobic bacteria treating wastewater in a treatment system.

It is a further object of the invention to maintain an average downward flow of air through the filter such that odorous compounds at the surface of the filter are adsorbed and oxidized in the depth of the filter.

It is a further object of the invention to utilize recycle flow from the filter to an anoxic or septic tank to enhance total nitrogen removal in the combined septic tank—filter system where nitrogen removal is desired.

SUMMARY OF THE INVENTION

The applicant discloses a compact high efficiency combined biological and physical unsaturated wastewater treatment filter configured for periodic backwashing that removes pollutants and pathogens from wastewater and other dirty water sources. In the present system, wastewater processed in a septic tank or by other primary treatment means to remove most settleable solids enters a dosing chamber through a distribution head. In the dosing chamber, the wastewater is passed through and is treated by a filter media coated by microbial biofilm. In the preferred embodiment, high frequency pulsed applications of wastewater are utilized to better distribute the wastewater evenly across the entire surface of the media. This provides a high uniformity of wastewater flow down through the pores of the media, which pushes air downward ahead of the wastewater pulse and also pulls air in through the media surface above the wastewater pulse as the pulse moves down into the media, thereby promoting air circulation through the media for optimal biofilm growth and removal of pollutants.

From the dosing chamber the treated wastewater (or for purposes of clarity, "treated effluent") is collected in an underdrain system and directed to a holding tank. From the holding tank, the treated effluent is discharged, in exemplary cases either into the environment above ground, in an irrigation system for reuse, or into a lateral field comprising a plurality of drain pipes under the ground that discharge the treated effluent into the underground environment through a plurality of holes on each drain pipe.

Treated effluent in the holding tank is periodically directed back through the underdrain to fluidize and backwash the filter media in the dosing chamber, thereby removing the most hydraulically restrictive portion of the biofilm growth out of the media pores and ultimately preventing excess growth from clogging the system. Backwashing also redistributes the media to eliminate preferential flow channels that may have formed and caused hydraulic short-circuiting and therefore inadequate treatment of wastewater. Such backwashing still leaves sufficient biofilm attached to the media to maintain a very high level of treatment.

The system provides a number of unexpected benefits; including enabling unexpected and surprisingly high sustained average wastewater loading rates, a very low wastewater application pressure, enhanced natural airflow into the filter media, excellent distribution of treatment throughout the filter media, retention of sufficient biofilm on the media after backwashing for continued treatment, and the capture and treatment of odors.

BRIEF DESCRIPTION OF THE FIGURES

The foregoing aspects and many of the attendant advantages of the invention will become more readily appreciated as the same becomes better understood by reference to the following detailed description, when taken in conjunction with the accompanying drawings, wherein.

DETAILED DESCRIPTION OF THE INVENTION

The following description is presented to enable a person of ordinary skill in the art to make and use various aspects and examples of the present invention. Any descriptions of specific materials, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described and shown, but is to be accorded the scope consistent with the appended claims.

Figure 1:
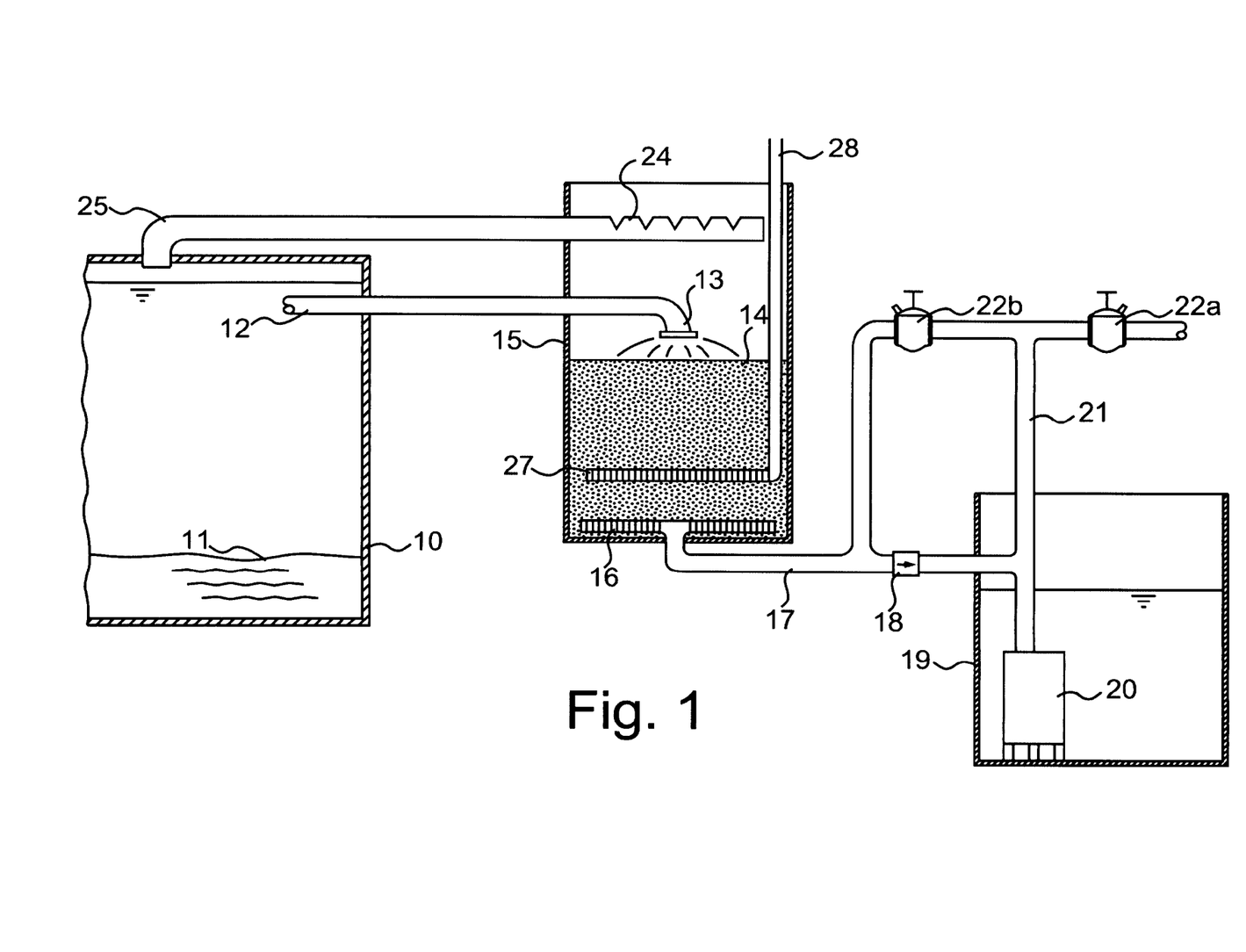
FIG. 1 is a sectional side view of a summary diagram of a preferred embodiment the claimed filter system.

In a preferred embodiment of present invention as shown in FIG. 1, a wastewater tank 10 receives raw wastewater and provides passive removal of settleable solids 11 and floating solids (not shown). Wastewater from such primary treatment is then directed using a pump, gravity, or other means into filter inlet 12. The wastewater next flows from inlet pipe 12 to a distribution head 13 that substantially evenly distributes the wastewater over a top surface area of a filter media 14. In the preferred embodiment of the invention, the wastewater is distributed intermittently and repeatedly. Although the intermittent application of wastewater to the filter media 14 is not required for proper functioning of the filter, intermittent application improves the movement of air through the filter, thereby improving filter capacity and treatment effectiveness. The compact nature of the filter combined with a low head splash style surface distribution device allows the wastewater to be distributed at a high uniformity to the filter surface with very little pressure head. This allows an energy efficient device such as a small dosing siphon to be used for providing the intermittent application flow to the filter. The splash or spray distribution head may in an alternative embodiment of the invention be changed to a flooding style of distribution for the lowest possible pressure head requirement.

The filter media 14 and the other filter components are contained by the filter vessel 15. The filter media 14 comprises filter media particles 30 on which microbial growth occurs (herein after termed biofilm 31) and which assimilates and biodegrades wastewater constituents as the wastewater flows by gravity through filter media 14. See FIGS. 1 and 2. Turned back to FIG. 1, treated effluent is collected near the bottom of filter vessel 15 in underdrain 16, and flows through treated effluent conveyance pipe 17 through a check valve 18 into treated effluent holding tank 19. Treated effluent pump 20 periodically pumps treated effluent into discharge pipe 21 for either discharge through a first discharge control valve 22a or for filter backwashing through a second control valve 22b. Although the preferred embodiment is described as above and as shown in FIG. 1, first and second control valves may in an alternative embodiment be combined into a single three-way valve for reason of compactness.

During backwash, treated effluent flows from discharge pipe 21 through control valve 22b thence via treated effluent pipe 17 to filter underdrain 16 where it is discharged into filter vessel 15 thereby fluidizing and backwashing filter media 14. The underdrain in a preferred embodiment is configured to fluidize the media uniformly, but it could be configured to fluidize the media in a manner to encourage some vertical media circulation within the filter. Alternatively, wastewater or other liquids could be backwashed through the system either by discharge pipe 21 or another inlet in filter vessel 15. Backwash flow containing excess biofilm and captured solids dislodged from the filter media 14 is conveyed upward to the backwash overflow trough 24 for conveyance through backwash discharge pipe 25 back to the wastewater tank 10 for additional passive clarification treatment. During backwashing the relatively high density of the filter media 14 is sufficient to retain it in filter vessel 15 in a fluidized state and prevent it from entering backwash overflow trough 24. Treated effluent pump 20 and control valves 22a and 22b are in a preferred embodiment electrically controlled by a timed controller, not shown. Air circulation through the filter media 14 is enhanced by a vent 27 that allows air to escape from the lower portion of the filter media through vent pipe 28.

Figure 2:
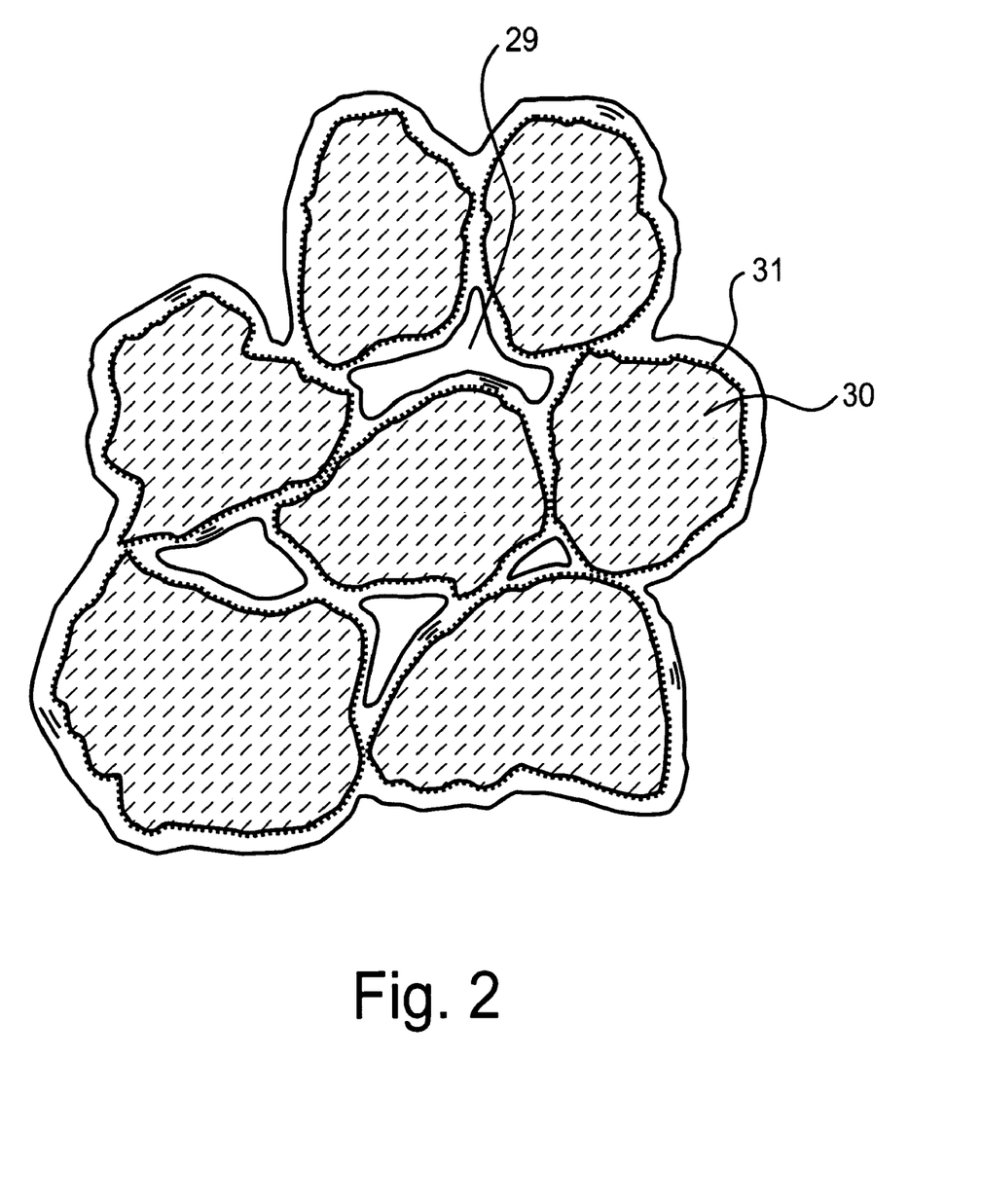
FIG. 2 is a sectional view of seven media particles representative of the filter media during the predominant unsaturated conditions.

Turning briefly to FIG. 2, a detailed depiction of several contacting particles of the filter media during general forward flow treatment operation of the filter is shown. Upon packing together, the filter media 14 (FIG. 1), which comprises sand or other relatively fine media particles, forms pores 29 for water flow, air flow, and physical filtration. The surfaces of media particles 30 provide sites for attached biofilm 31 and biological treatment. A majority of the time the filter is in use it is in an unsaturated condition, wherein air fills the pores 29 between media particles and water forms a film over the surfaces of the media particles 30 with the attached biofilm growth 31. Air in the media pores 29 provides oxygen to the attached microbial growth 31 to enable the microbial growth to efficiently consume the waste constituents in the water. Although not directly evident in the two-dimensional depiction in FIG. 2, the air in the larger media pores is contiguous throughout the unsaturated filter media. During backwashing, the media is fluidized and excess microbial growth and trapped particles are scoured from the media. The filter performance is affected by the depth of the filter media, which influences the physical filtration and the contact time between the wastewater and the biofilm on the media. A deeper filter media bed will therefore provide higher treated effluent quality, although the depth of the media bed may be limited by hydraulic grade line and cost considerations.

Figure 3:
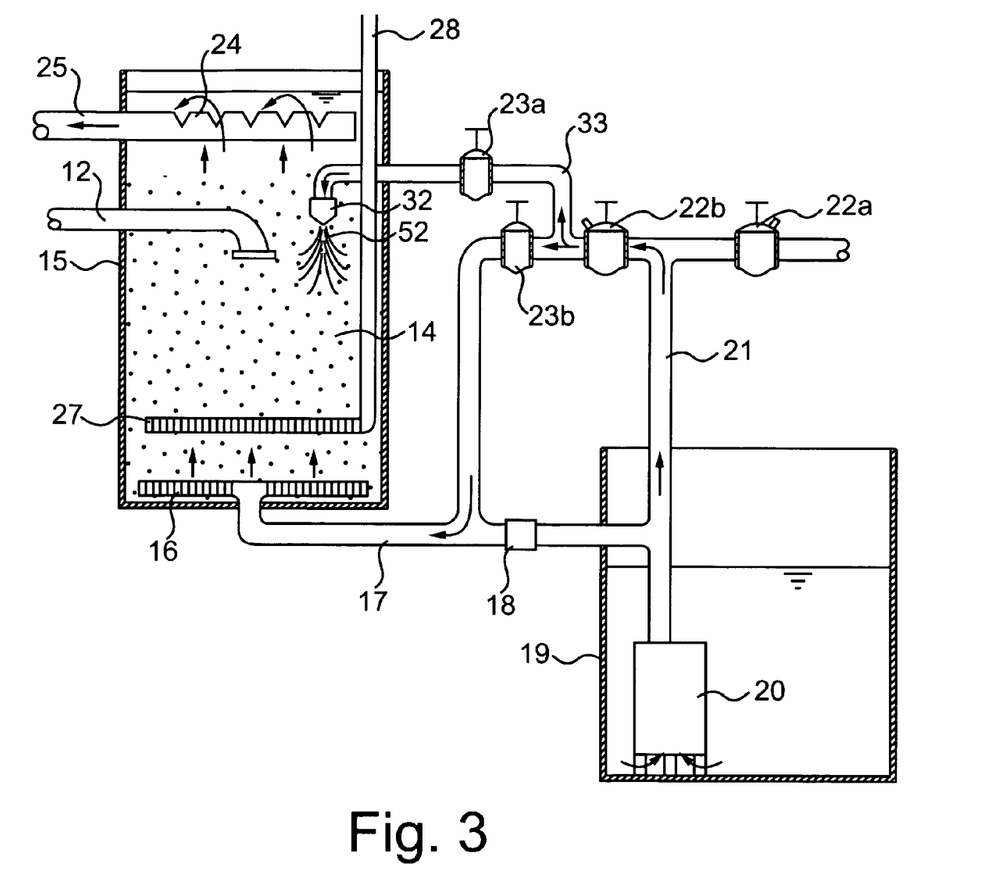
FIG. 3 is a detailed sectional side view diagram of the backwash mode of the preferred embodiment of the claimed filter system.

To reduce the likelihood of clogging, the present invention in a preferred embodiment has a backwash mode, as depicted in detail in FIG. 3. Backwashing keeps the biofilm from becoming excessively thick and reduces mass transfer limitations from the pore liquid to the microbes performing biodegradation of the pollutants. When the system is in backwash mode, the first discharge control valve 22a that directs treated wastewater out of the system is closed, while the second discharge control valve 22b is open. When in backwash mode, check valve 18 closes automatically due to a pressure differential. This allows treated effluent pump 20 to move water "upstream" through the discharge pipe 21 and treated effluent conveyance pipe 17 and back into underdrain 16 of the filter and thence the packed media filter 14, substantially fluidizing the media in the process as shown in FIG. 3. Backwash overflow trough 24 comprising weir or other openings catches the mixture of backwash water and excess solids as it approaches the top of filter vessel 15, and redirects it through backwash discharge pipe 25 to wastewater tank 10 (not shown in FIG. 3) or other wastewater settling/equalization upstream of the media filter. Backflow through filter inlet 12 is restricted by an upstream orifice, check valve, or other means.

Based on the above description and related figures, treated effluent holding tank 19 thus serves the dual purpose of both storing treated water for discharge or irrigation reuse and storing treated water for the next backwash event. Primary wastewater tank 10 or similar (as described above and shown in FIG. 1) upstream of the filter likewise serves multiple purposes in the operational scheme, providing settling treatment for both the raw wastewater and for the solids released from the filter during backwashing. Wastewater tank 10 provides a third purpose in that the treated effluent recycled back to the tank during backwashing typically contains some nitrate, which will undergo denitrification in the anaerobic environment of the wastewater tank 10. This is even more a benefit where nitrate is a pollutant of concern.

Continuing with FIG. 3, also shown in detail is an alternative embodiment of the present invention, wherein an optional surface spray wash nozzle system comprising one or more spray nozzles 32 is present. This surface wash system is supplied with higher-pressure water from discharge pipe 21 during backwashing through a surface spray conveyance pipe 33. First gate valve 23a and second gate valve 23b or other throttling means are used to control the flow rates to treated effluent conveyance pipe 17 and spray conveyance pipe 33. The surface spray wash nozzles 32 provide spray streams 52 that impinge the media surface, thereby providing higher energy scouring of the media surface to improve media cleaning in the critical top surface area. Nozzles 32 also help mix the media vertically to improve biofilm distribution within the filter.

Figure 4:
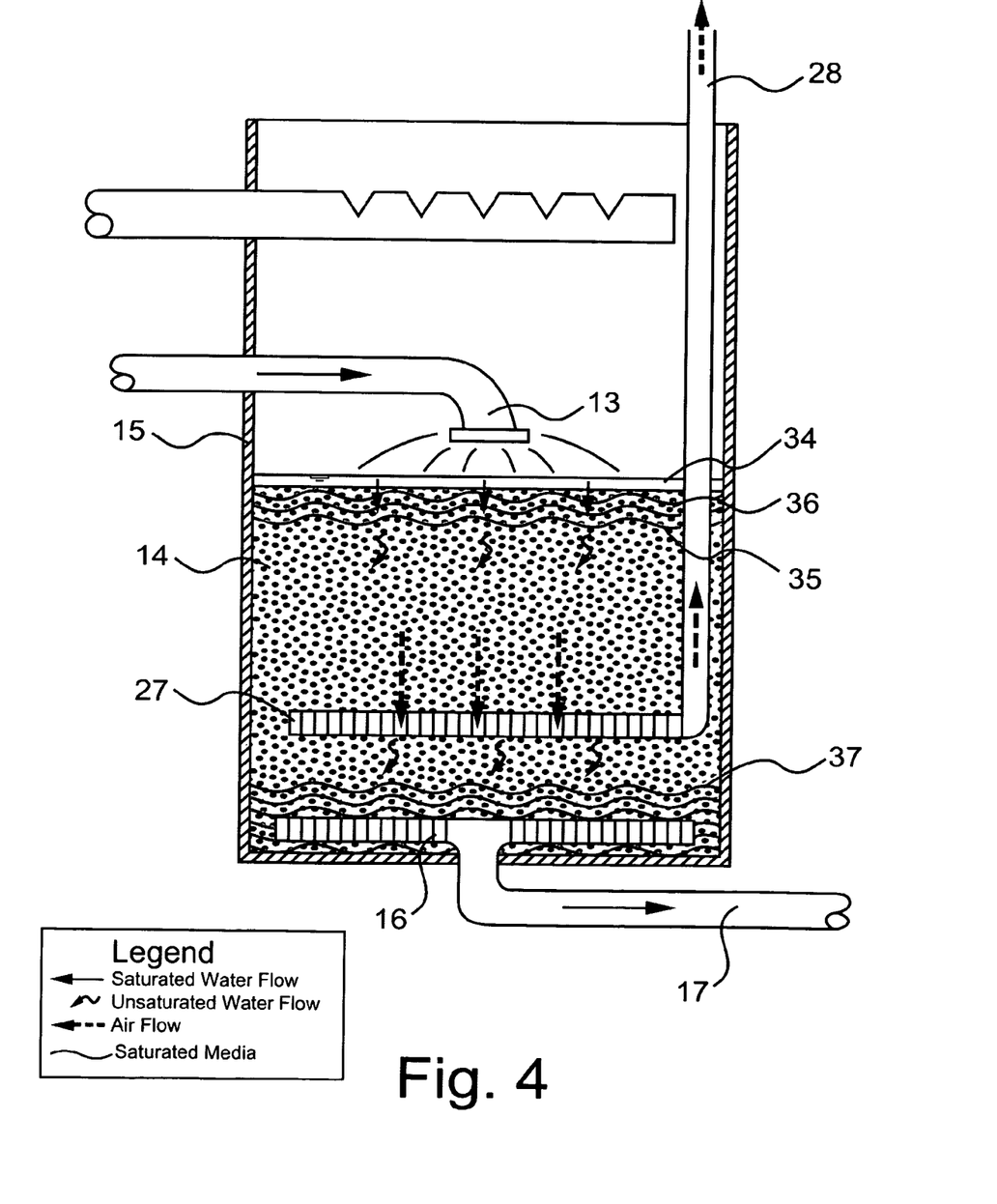
FIG. 4 is a detailed sectional side view diagram of the conditions near the end of the application of a pulse of wastewater in the preferred embodiment of the claimed filter system, wherein temporary surface ponding and media saturation conditions during each brief application of wastewater to the filter are shown, along with air being forced down below the wetting front and ultimately out the a vent.
Figure 5:
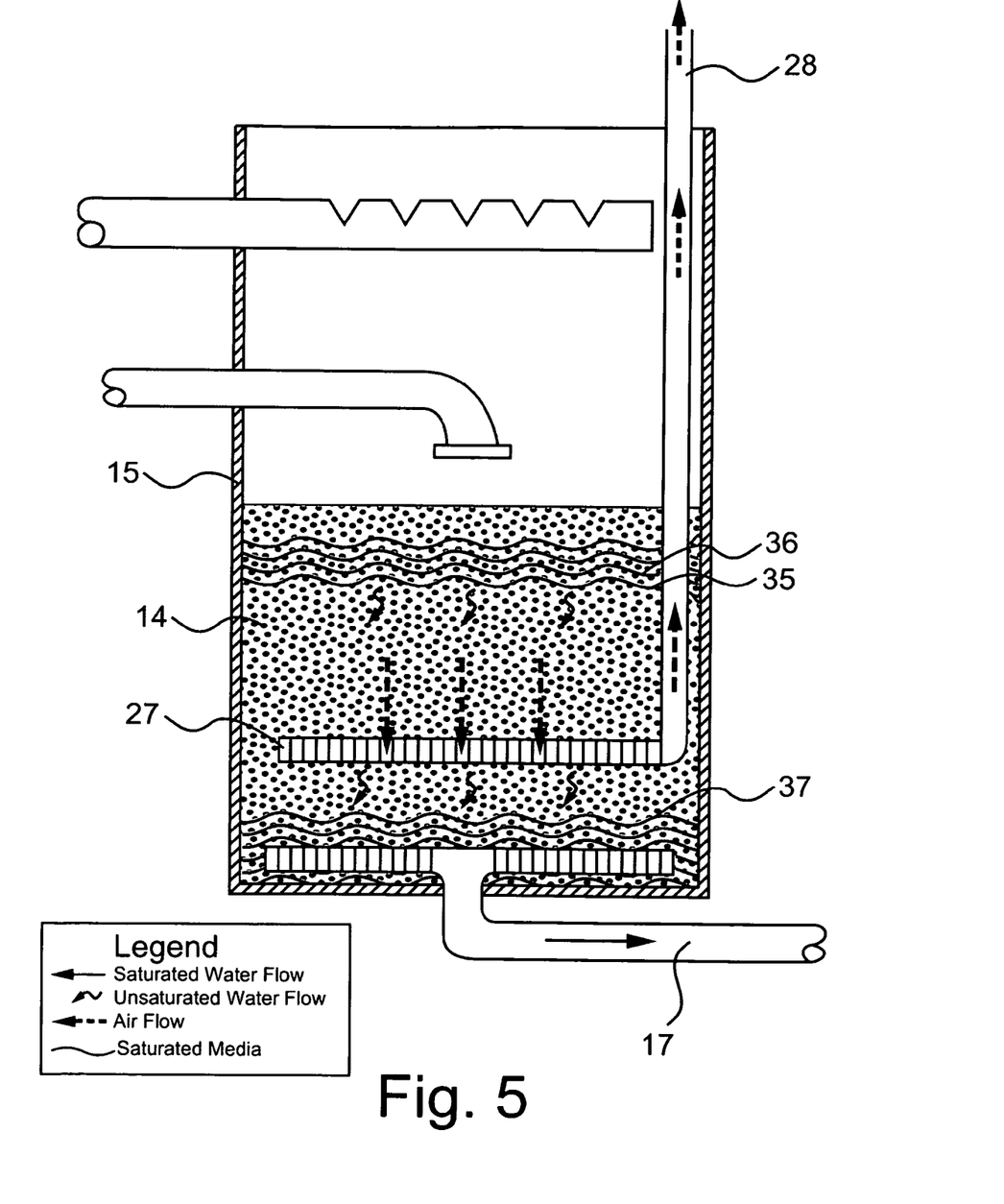
FIG. 5 is a detailed sectional side view diagram of media conditions shortly after wastewater application has ceased in a preferred embodiment of the claimed filter system, wherein air is depicted being drawn into the filter above the saturated pulse, shown moving downwards.
Figure 6:
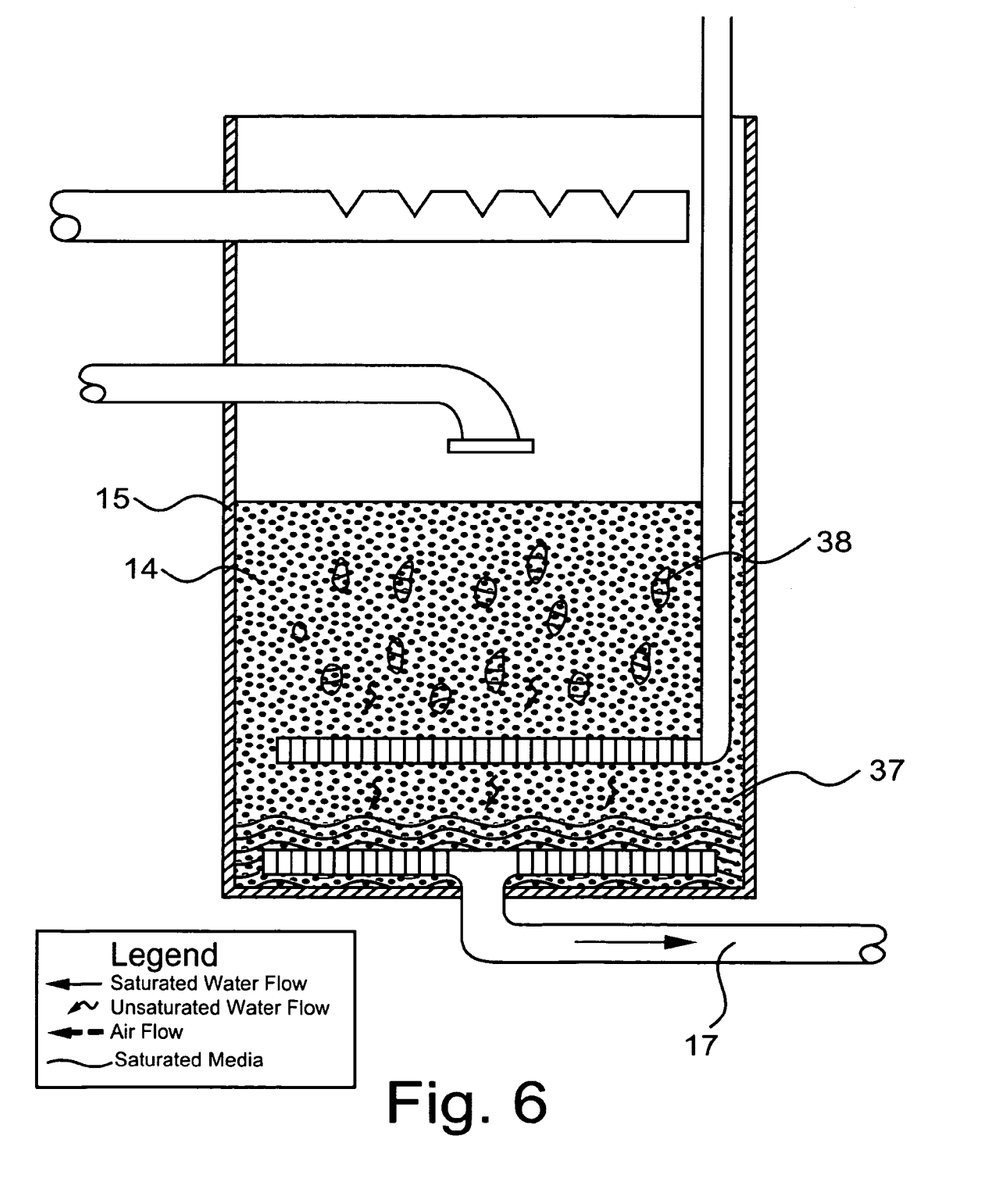
FIG. 6 is a detailed sectional side view diagram of a preferred embodiment of the claimed filter system, depicting the predominant media condition between wastewater applications wherein the media is in an unsaturated condition.

In the preferred embodiment, wastewater is dosed into filter vessel 15 from the upstream wastewater tank 10 on a high frequency basis, typically for several seconds every few minutes. The large-scale movement of wastewater and air in the filter during and between doses of wastewater is depicted in FIGS. 4, 5, and 6. The pulse-feed application of wastewater to the filter provides brief intermittent episodes of saturation at the filter surface, resulting in high distribution uniformity, while driving air downwards into the filter media to provide oxygen for aerobic biological treatment. FIG. 4 depicts the condition of media saturation near the filter surface during each brief application of wastewater through the distribution head 13 above the filter media 14. Here ponded wastewater 34 on the surface of the filter media 14 is depicted. For coarse media, actual ponding may not occur or may be very brief. A saturated wetting front 35 (the instantaneous boundary between the saturated media above and the unsaturated media below) for the upper saturated zone 36 as well as a continuously saturated lower zone 37 is also depicted. In the preferred embodiment of the invention employing fine media, lower zone 37 is kept in a continuously saturated state by the capillary action of the media pores above the treated effluent at the level of the underdrain 16. As saturated wetting front moves downwards due to gravity and capillary action, air begins to move into vent 27 and out vent pipe 28. In situations where greater nitrogen removal or filter residence time is desired, it may be beneficial to back the treated wastewater up into the lower portion of the media to increase the volume of the lower saturated zone 37.

FIG. 5 shows media conditions shortly after wastewater application has ceased. Note that as compared to FIG. 4, in FIG. 5 gravity and capillary action has had time to cause the upper saturated zone 36 and its saturated wetting front 35 to move further downwards in the filter vessel 15. Air trapped between the downward moving zone of saturation 36 and continuously saturated lower zone 37 near the bottom of filter media 14 is allowed to continue escaping through vent 27 and vent pipe 28. As this occurs, new air is drawn into the upper layer (not labeled) of filter media 14 through the filter media surface to fill in the pores 29 on the media above the downward moving upper saturated zone 36. As the wastewater continues to flow down into the filter due to gravity, it eventually spreads out vertically in the media due to capillary forces until there are only small scattered saturated pockets 38, with the vast majority of the media pores becoming unsaturated as depicted in FIG. 6. During this phase, the downward wastewater velocity slows, and the thickness of the water film around media particles decreases, allowing more time and closer contact with the biofilm around the media particles for biological treatment. The phase depicted in FIG. 6 with media water film conditions as shown in FIG. 2 represents the predominant unsaturated condition of the filter for the relatively long durations between the brief dosing periods.

Figure 7:
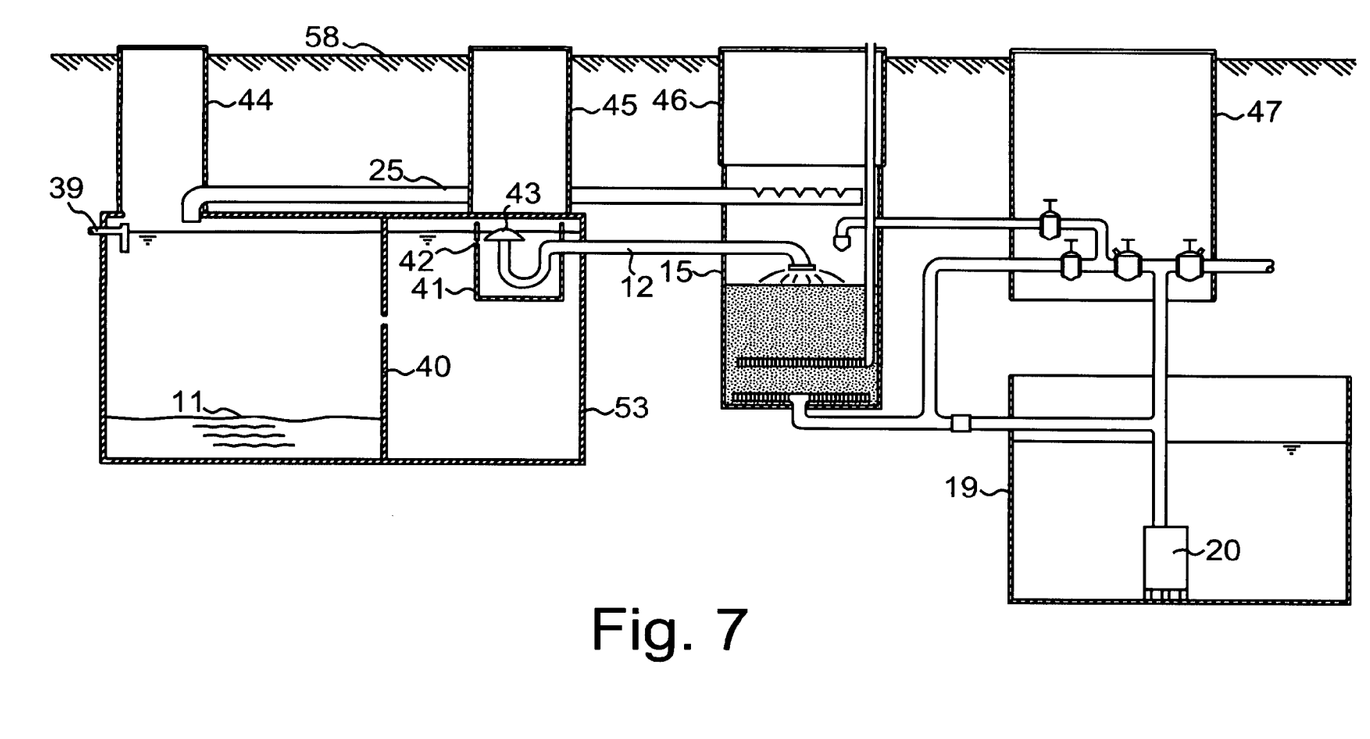
FIG. 7 is a sectional side view of an alternative embodiment of the claimed filter system, wherein the filter system is shown in conjunction with a buried septic tank.

FIG. 7 depicts an additional alternative embodiment of the present invention, wherein in this exemplary case is a subsurface embodiment of the filter system in conjunction with a buried septic tank. Although again this figure is diagrammatic, the scale of the individual components is more representative of the actual scale for the system in use for a residential or small commercial application. In this alternative embodiment, raw wastewater enters a standard two-chamber septic tank 53 at an inlet pipe 39, receiving passive clarification treatment to remove settleable solids 11 prior to passing through a port in a dividing wall 40 into a second chamber of septic tank 53. Within the second chamber is a smaller isolated chamber 41 with an orifice entry 42 to control the rate of flow into said isolated chamber. Within isolated chamber 41 is a dosing siphon 43, which intermittently doses wastewater through filter inlet pipe 12 into the filter vessel 15. First riser 44, second riser 45, third riser 46, and fourth riser 47 provide access to the various parts of the system from ground surface 58. The size and geometry of filter vessel 15 are such that the filter vessel could fit within fourth riser 47 if desired for compactness. In the exemplary embodiment as shown, the backwash discharge pipe 25 discharges near the beginning of the first chamber of septic tank 53 to provide the greatest opportunity for solids in the backwash water to settle.

Figure 8:
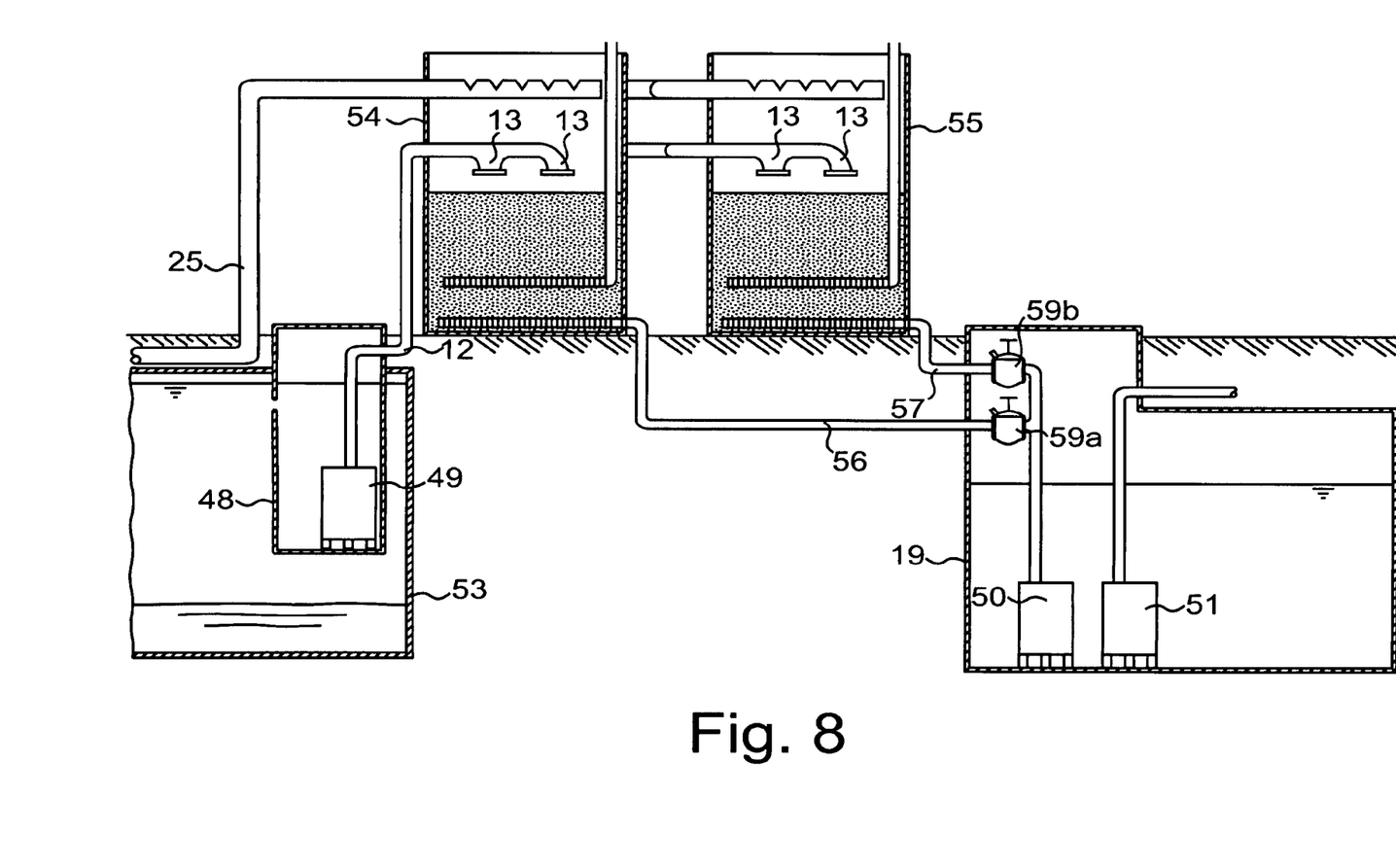
FIG. 8 is a sectional side view of an additional alternative embodiment of the claimed filter system, wherein the system is configured in an above-ground fashion and wherein multiple filter vessels are shown.

FIG. 8 depicts an above-ground alternative embodiment of the filter system demonstrating some additional features to further enhance filter performance in this and other embodiments. Here, septic tank 53 comprises a pump chamber 48 that itself comprises a pump 49 that sends wastewater through filter inlet 12 to first filter unit 54 and second filter unit 55. An electrical controller utilizing float switches and timers, not shown, controls operation of pump 49 to dose wastewater to the filters on an intermittent basis, while maintaining maximum and minimum water levels in wastewater tank 10 as influent flows vary. Filter units 54 and 55 comprise multiple distribution heads 13. Treated effluent leaves the filter units through their respective underdrains (shown but not labeled), through first treated effluent pipe 56 and second treated effluent pipe 57, to treated effluent holding tank 19. Treated effluent holding tank 19 comprises a separate backwashing pump 50 and discharge pump 51, thereby eliminating both the need for check valves on the treated effluent pipelines and the need for a control valve on the discharge pipeline. During backwashing, first control valve 59a and second control valve 59b are actuated sequentially to backwash first filter unit 54 and second filter unit 55 separately and in sequence, although not necessarily in that order. Backwash from both filters is returned to septic tank 53 through backwash discharge pipe 25. The system depicted in FIG. 8 could be further modified to include yet additional filter units, and is shown with just two in this embodiment for purposes of simplicity and efficiency.

In an alternative embodiment of the present invention not shown here, the filter media may be natural or man-made, depending upon desired cost and hydraulic performance considerations. Media with a high specific surface area, good backwashing characteristics, and good water holding capacity are generally preferred. Preferably, most filter components should be made of materials that resist corrosion or degradation in wet conditions, such as plastic or stainless steel. In yet other alternative examples of the present invention, multiple layers of differing media may provide benefits for high strength wastewater. For instance, a coarser, less dense media over a finer, denser media would require less frequent backwashing than a uniform single media when treating high strength wastewater. Alternative media may provide benefits in treatment effectiveness and/or economics. The use of zeolite as the media in the present system may provide additional treatment because of zeolite's high capacity for adsorbing some potential pollutants. The use of fine pumice as the media may provide enhanced performance because of the low density, surface roughness, and high moisture holding capacity of fine pumice.

In yet an additional alternative embodiment of the present invention, vent 27 and vent pipe 28 (see FIG. 1) are not present. In this embodiment, air may escape from the filter by forcing its way through one of the saturated zones after air pressure has built up sufficiently. Such a system would reduce the wastewater infiltration rate and the amount of oxygen transferred into the media, and therefore should only be used where the vent 27 and vent pipe 28 were not a possible option. Overall, venting improves the filter's performance. To assist with venting, in an additional alternative embodiment of the invention, a small fan to draw air through the vent can further enhance oxygen transfer and venting, which may be particularly advantageous when treating high strength wastewater. Although not a preferred embodiment of the invention, an air vent in communication with a sufficiently powerful fan may also be located below the lower capillary fringe (37 in FIG. 4) or downstream of the underdrain 16 to overcome the air flow resistance in the capillary fringe and still provide supplemental air circulation through the filter media.

As described previously, the preferred embodiment of the present system utilizes a special manifold incorporating a check valve that allows treated effluent to gravity flow from the treated effluent storage tank, but backwash flow can be pressurized through a discharge control valve in a high location and/or more accessible location than the location shown for discharge control valve 22b.

The present invention provides many advantages over traditional wastewater treatment systems. First, it provides a high level of wastewater treatment and physical filtration in a much smaller footprint than conventional unsaturated wastewater filters and without needing secondary clarification treatment. Similar to fine non-backwashing wastewater filters, it provides both physical filtration and aerated biological treatment, but unlike the conventional filters, incorporates backwashing previously only used in high rate saturated filters. The present system is capable of reducing biochemical oxygen demand, suspended solids, and turbidity from wastewater to the very low levels similar to those found in conventional "tertiary" wastewater treatment plants of approximately 10 mg/L for both biochemical oxygen demand and suspended solids. This is accomplished at surface area loading rates from 5 to 20 times as high as conventional fixed media non-backwashing wastewater filters such as biotextile filters and recirculating gravel filters.

The present system is also relatively inexpensive because an internal structure is not required as with fixed media filters. Furthermore, it provides a greater specific surface area for microbial growth than many other unsaturated filters because finer media can be used without plugging. The present system also provides an extremely energy-efficient means for transferring oxygen to the aerobic microbes biodegrading the wastewater without the need for large blowers, mixers, or pressurized air diffusers. Supplying sufficient oxygen for aerobic microbes is important for a compact system because aerobic microbes provide a much faster rate of pollutant biodegradation than anaerobic microbes.

A benefit to coupling the present invention to a septic tank such as in one of the above-described alternative embodiments is that the amount of treated effluent recycled back to a septic tank either as part of the backwash cycle or as a direct return can be controlled to substantially increase the total nitrogen removal of the combined system due to enhanced biological denitrification in the septic tank.

Data collected from an installation of the system provides insight into influent and treated effluent water quality, as well as application drain time. A tracer test as well as other operational testing was also performed. In this test system, an 18-inch diameter filter vessel was constructed using a 40-gallon flat bottom polyethylene tank. The underdrain in this test system was assembled from ¾ inch slotted PVC pipe with 0.020-inch wide slots. Pea gravel was placed on the underdrain, above which was placed a 1-inch layer of coarse #3 sand, followed by a 10 inch layer of #20 silicon filter sand and finally 12 inches of 14×30 zeolite placed on top of the filter sand layer. Municipal wastewater was fed to the filter vessel from a 1200-gallon septic tank using a submersible pump controlled by a timer. A float switch was used to control a pump feeding raw domestic wastewater to the septic tank, thereby keeping a nearly constant average daily inflow and level in the septic tank. A 300-gallon polyethylene tank was used for the treated effluent holding tank, and a submersible treated effluent pump was set therein. The treated effluent holding tank pump was set up for timer control to provide backwash flow to the filter several times per day. An internal air vent, a small vent fan, and surface wash nozzles were added.

Within a few weeks of startup the prototype filter was removing most of the carbonaceous biochemical oxygen demand (BOD) from the applied wastewater. The filter took several more weeks to begin nitrifying. This is not unusual as nitrifying bacteria are relatively slow growing. Drain time performance for each application was improved substantially by the addition of surface wash nozzles. Overall filter performance was excellent within a few months, and showed very low effluent BOD, ammonia, and turbidity at a net raw wastewater surface loading rate of 320 gallons per day (gpd) with four 2 minute backwashes per day (gross wastewater loading rate of 440 gpd from the septic tank including backwash recycle). Based on nitrate measurements, partial denitrification was also occurring. In related testing, total nitrogen removal was substantially enhanced by recycling a greater amount of backwash water into the septic tank.

Average concentrations of nitrogen compounds after acclimation are shown below in Table 1, below. Raw wastewater ammonia-N concentrations during the period averaged approximately 25 mg/L. As can be seen in the table, the prototype filter provided essentially full nitrification treatment and partial denitrification. Biochemical oxygen demand in treated effluent from the filter was measured at 3.5 mg/L one month after startup and non-detect in subsequent tests versus an average biochemical oxygen demand of 106 mg/L for the raw wastewater during the test period. Substantial fecal coliform bacteria reduction (2-4 logs) was also measured for the prototype filter.

TABLE 1

| Water Quality Results | | | |
|---|---|---|---|
| Septic Tank Effluent | | Filter Treated Effluent | |
| Ammonia-N | Nitrate-N | Ammonia-N | Nitrate-N |
| 18.0 | 0.0 | 0.5 | 13.6 |

Figure 9:
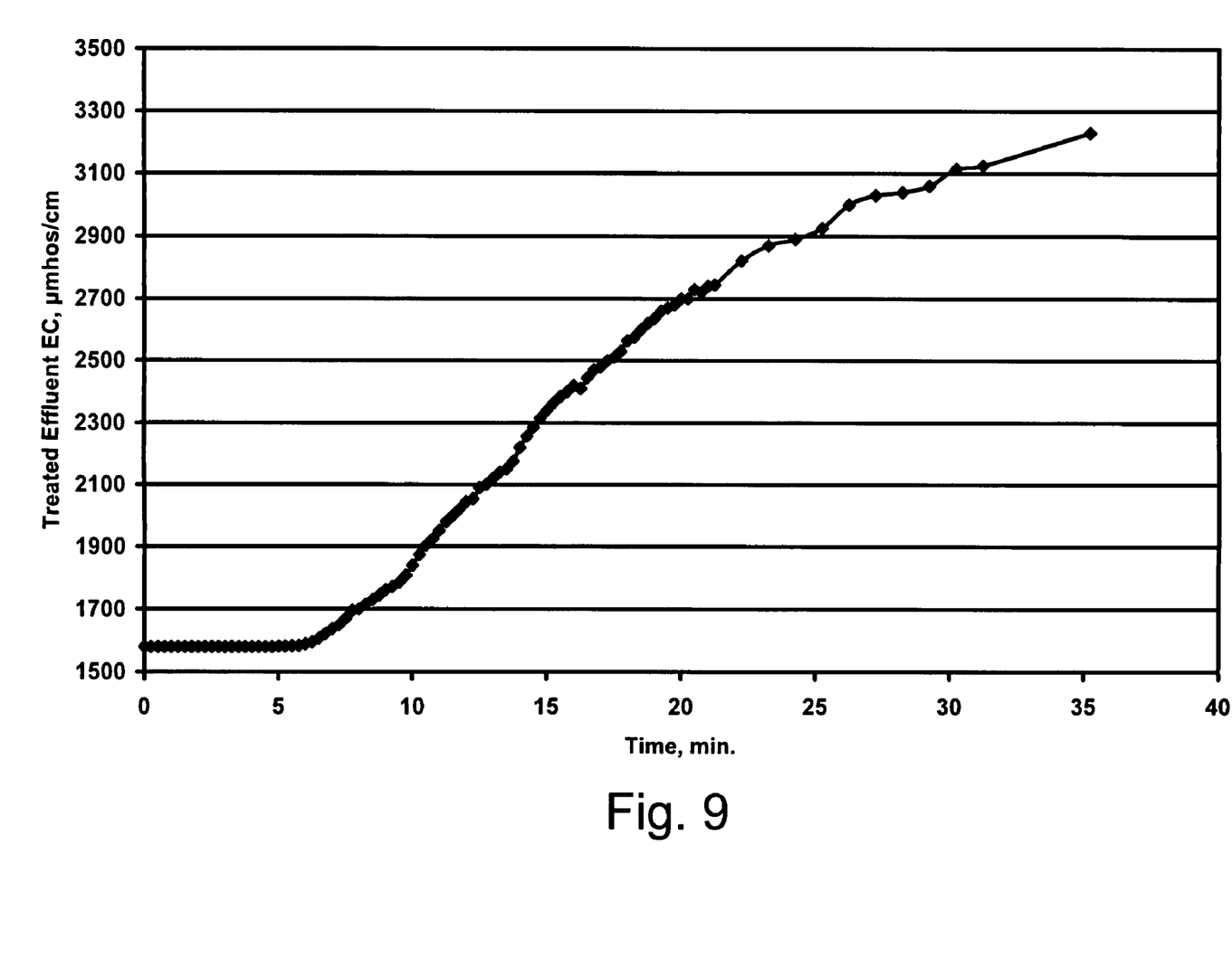
FIG. 9 is a chart showing data from an electrical conductivity tracer test performed on an exemplary embodiment of the claimed filter system.

FIG. 9 shows additional test results from an electrical conductivity (EC) Tracer Test performed on the prototype filter. The Y-axis in this chart shows electrical conductivity and is expressed as reciprocal micro ohms per centimeter (μmhos/cm). The X-axis shows time, in minutes. A mean residence time of approximately 17 minutes is derived. This is greater than the typical residence time in trickling filters, indicating a better opportunity for a higher level of treatment. This residence time is similar to residence time for textile media filters.

With respect to the above description then, it is to be realized that material disclosed in the applicant's drawings and description may be modified in certain ways while still producing the same result claimed by the applicant. Such variations are deemed readily apparent and obvious to one skilled in the art, and all equivalent relationships to those illustrated in the drawings and equations and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact disclosure shown and described, and accordingly, all suitable modifications and equivalents may be resorted to, falling within the scope of the invention.

I claim:
1. A wastewater treatment system for removing pollutants and pathogens from wastewater and other dirty water sources, the treatment system comprising:
   a. an inlet flow path for receiving wastewater from a source outside the treatment system;
   b. a vessel for containing said wastewater, the vessel comprising a substantially unsaturated packed media filter configured for biological and physical treatment of said wastewater and wherein said wastewater is treated as it flows by gravity through pores in said packed media;
   c. an airflow inducing means for inducing airflow through the media in the same downward direction as the flow of wastewater;
   d. a dosing means for dosing said media with said wastewater;
   e. a drain fluidly connected to said vessel for discharging treated wastewater from said vessel; and
   f. a means for cleaning said media through intermittent backwashing and fluidization of said media.

2. The wastewater treatment system according to claim 1 wherein said dosing means creates a saturated wetting front that moves through said media, inducing airflow through the media in the same downward direction as the flow of wastewater.

3. The wastewater treatment system according to claim 1 further comprising an air vent in communication with and below the surface of said media, providing a conduit to exhaust downwardly flowing air to the outside of the media.

4. The wastewater treatment system according to claim 3 wherein said airflow inducing means is a fan or blower attached to said vent and is employed to increase the flow of air through the media and vent.

5. The wastewater treatment system according to claim 1 wherein said backwash comprises said treated wastewater.

6. The wastewater treatment system according to claim 5 further comprising a primary treatment means upstream from said vessel, and wherein an amount of said backwashed treated wastewater enters said primary treatment means for removal of solids in the backwash water by settling.

7. The wastewater treatment system according to claim 6 wherein said amount is dependent on conditions in said primary treatment means for anoxic treatment of nitrate.

8. The wastewater treatment system according to claim 1 wherein an anoxic saturated zone is purposely maintained in the lower zone of the system to promote treatment of nitrate and other pollutants more effectively removed in an anoxic saturated zone after initial treatment in the unsaturated portion of the system.

9. The wastewater treatment system filter according to claim 1 in which one or more nozzles discharge liquid to intermittently scour biofilm buildup from said media.

10. The wastewater treatment system according to claim 1 further comprising a pump in fluid connection to said drain for conveying said treated wastewater through said drain into said vessel for cleaning and fluidizing said media.

11. A method of treating wastewater, the method comprising the steps of:
  a. an accepting step of accepting wastewater into a vessel comprising a filter further comprising packed media configured for biological and physical treatment of said wastewater;
  b. a treating step wherein said wastewater is treated during residence in said packed media filter and during which air flow is induced to move downward from the media surface into said media, and in which said media is substantially unsaturated;
  c. a draining step of draining treated wastewater by gravity from packed media in said vessel; and
  d. a backwashing step of backwashing and fluidizing said media with said treated wastewater.

12. The method of claim 11 wherein in said accepting step said wastewater is repeatedly dosed into said vessel such that a portion of said filter media are temporarily in a saturated state, said saturated state comprising a transitory moving saturated wetting front which by its movement forces air into said media.

13. The method of claim 11, wherein a vent below the surface of said packed media allows air to move freely through and out of said media.

14. A method of treating wastewater, the method comprising the steps of:
  a. an accepting step of accepting wastewater into a vessel comprising media configured for the biological and physical treatment of said wastewater in a substantially unsaturated environment, wherein said wastewater accepted creates a saturated wetting front that moves through said media and forces air from said vessel;
  b. a treatment step wherein said wastewater is treated by said media;
  c. a draining step of draining said wastewater through a drain in said vessel, and
  d. a backwashing step of backwashing and fluidizing said media with said treated wastewater.

* * * * *